United States Patent
Yamada et al.

(10) Patent No.: US 10,791,451 B2
(45) Date of Patent: Sep. 29, 2020

(54) PROXIMITY SERVICE DISCOVERY USING A LICENSED FREQUENCY SPECTRUM

(75) Inventors: Shohei Yamada, Camas, WA (US); Ahmad Khoshnevis, Portland, OR (US); Zhanping Yin, Vancouver, WA (US); John Michael Kowalski, Camas, WA (US); Kenneth James Park, Cathlamet, WA (US)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/560,725

(22) Filed: Jul. 27, 2012

(65) Prior Publication Data

US 2014/0031028 A1    Jan. 30, 2014

(51) Int. Cl.
*H04W 8/00* (2009.01)
*H04W 76/14* (2018.01)

(52) U.S. Cl.
CPC .......... *H04W 8/005* (2013.01); *H04W 76/14* (2018.02)

(58) Field of Classification Search
CPC ... H04W 76/023; H04W 8/005; H04W 48/16; H04W 76/02; H04W 4/008; H04W 76/14
(Continued)

(56) References Cited

U.S. PATENT DOCUMENTS 7,613,426 B2   11/2009   Kuehnel et al.
7,876,701 B2   1/2011   Li et al.
(Continued)

FOREIGN PATENT DOCUMENTS

WO   2010078271 A2   7/2010
WO   2011036507 A1   3/2011
(Continued)

OTHER PUBLICATIONS

Huawei, Renesas Mobile Europe Ltd, "Distinction between service and proximity discovery," 3GPP TSG-SA WG1 Meeting #57, S1-120074, Feb. 13-17, 2012, Kyoto, Japan, 5 pages.
(Continued)

*Primary Examiner* — Dinh Nguyen
(74) *Attorney, Agent, or Firm* — Kilpatrick Townsend & Stockton LLP

(57) ABSTRACT

Methods, systems, and devices provide improved proximity services. In one aspect, a base station includes an information generating module and an information transmission module. The information generating module generates control information for causing a mobile device to initiate a discovery signal transmission procedure. The discovery signal transmission procedure allows the mobile device to be discovered. The information transmission module transmits the control information to the mobile device. In another aspect, a mobile device includes an information receiving module, a control module, and a signal transmission module. The information receiving module receives control information. The control module initiates a discovery signal transmission procedure for proximity services responsive to the information receiving module receiving the control information. The discovery signal transmission procedure includes generating a discovery signal allowing the mobile device to be discovered. The signal transmission module broadcasts the discovery signal.

8 Claims, 8 Drawing Sheets

(58) Field of Classification Search
USPC ......... 455/41.2, 414.1, 418, 419, 422.1, 517
See application file for complete search history.

(56) References Cited

U.S. PATENT DOCUMENTS

| | | | |
|---|---|---|---|
| 7,898,983 B2 | 3/2011 | Laroia et al. | |
| 7,961,698 B2 | 6/2011 | Wu et al. | |
| 7,961,708 B2 | 6/2011 | Li et al. | |
| 7,974,574 B2 | 7/2011 | Shen et al. | |
| 7,983,702 B2 | 7/2011 | Li et al. | |
| 7,984,132 B2 | 7/2011 | Park et al. | |
| 8,005,091 B2 | 8/2011 | Wu et al. | |
| 8,078,110 B2 | 12/2011 | Li et al. | |
| 8,078,111 B2 | 12/2011 | Jovicic et al. | |
| 8,082,303 B2 | 12/2011 | Laroia et al. | |
| 8,102,849 B2 | 1/2012 | Martinez Bauza et al. | |
| 8,107,565 B2 | 1/2012 | Li et al. | |
| 8,112,108 B2 | 2/2012 | Li et al. | |
| 8,121,097 B2 | 2/2012 | Li et al. | |
| 8,134,931 B2 | 3/2012 | Laroia et al. | |
| 8,139,531 B2 | 3/2012 | Li et al. | |
| 8,140,003 B2 | 3/2012 | Laroia et al. | |
| 8,140,103 B2 | 3/2012 | Wu et al. | |
| 8,144,636 B2 | 3/2012 | Li et al. | |
| 8,160,039 B2 | 4/2012 | Li et al. | |
| 8,189,491 B2 | 5/2012 | Laroia et al. | |
| 8,189,508 B2 | 5/2012 | Park et al. | |
| 8,189,555 B2 | 5/2012 | Wu et al. | |
| 8,199,766 B2 | 6/2012 | Li et al. | |
| 8,203,960 B2 | 6/2012 | Li et al. | |
| 2005/0021663 A1* | 1/2005 | Knauerhase ...... | H04L 29/08846 709/217 |
| 2006/0160544 A1* | 7/2006 | Sun ................. | H04W 8/18 455/456.1 |
| 2006/0168343 A1* | 7/2006 | Ma ................. | H04W 52/38 709/245 |
| 2009/0017855 A1* | 1/2009 | Kwon et al. ............... | 455/509 |
| 2009/0116430 A1* | 5/2009 | Bonta ................ | H04W 84/18 370/329 |
| 2009/0323648 A1* | 12/2009 | Park ................. | H04W 8/005 370/338 |
| 2010/0165882 A1* | 7/2010 | Palanki et al. ............. | 370/254 |
| 2010/0261469 A1 | 10/2010 | Ribeiro et al. | |
| 2010/0317291 A1* | 12/2010 | Richardson ....... | H04W 74/0825 455/63.1 |
| 2011/0103264 A1 | 5/2011 | Wentink | |
| 2011/0117907 A1* | 5/2011 | Hooli .............. | H04W 72/02 455/422.1 |
| 2011/0134827 A1 | 6/2011 | Hooli et al. | |
| 2011/0228666 A1 | 9/2011 | Barbieri et al. | |
| 2011/0258313 A1 | 10/2011 | Mallik et al. | |
| 2011/0268004 A1 | 11/2011 | Doppler et al. | |
| 2011/0300892 A1 | 12/2011 | Hakola et al. | |
| 2012/0011247 A1 | 1/2012 | Mallik et al. | |
| 2012/0046025 A1* | 2/2012 | Das et al. ................. | 455/422.1 |
| 2012/0173623 A1 | 7/2012 | Vanderveen | |
| 2012/0320790 A1* | 12/2012 | Shaffer ............ | H04W 40/246 370/254 |
| 2014/0057637 A1* | 2/2014 | Hoang ............ | H04W 56/0045 455/445 |

FOREIGN PATENT DOCUMENTS

| | | |
|---|---|---|
| WO | 2011163088 A1 | 12/2011 |
| WO | 2012088470 A1 | 6/2012 |

OTHER PUBLICATIONS

International Patent Application No. PCT/JP2013/004452, International Search Report dated Oct. 8, 2013, 4 pages.
Wu, Xinzhou, et al., "FlashLinQ: A Synchronous Distributed Scheduler for Peer-to-Peer Ad Hoc Networks," 2010 48th Annual Allerton Conference on Communication, Control, and Computing (Allerton), Sep. 29-Oct. 1, 2010, pp. 514-521, IEEE, US.
Abraham, Santosh, et al., "Efficient Device and Service Discovery for Peer-to-Peer (P2P) scenarios," Presentation to IEEE Working Group 802.11, Oct. 25, 2011, Document No. IEEE 802.11-11/1517r0, IEEE, US.
Ghadialy, Zahid, "Proximity-based Services (ProSe)—New Study Item in 3GPP Rel-12," 3G and 4G Wireless Blog, Dec. 6, 2011, http://3g4g.blogspot.com/2011/12/proximity-based-services-prose-new.html.
U.S. Appl. No. 13/408,910 entitled "Allocating and Determining Resources for a Device-to-Device Link" filed Feb. 29, 2012.
Cho, Seungkwon, et al., "Enhancements to Direct Communication for Proximity-based Applications," Presentation to IEEE Working Group 802.16, Jul. 13, 2012, Document No. IEEE 802.16-12-0461-00-Gcon, IEEE, US.
European Patent Application No. EP 13823210.3, Extended European Search Report dated Feb. 12, 2016, 3 pages.
Huawei, Renesas Mobile Europe Ltd, "Distinction between service and proximity discovery", 3GPP Draft; S1-120266 rev of S1-120188 rev of S1-120074 ProSe Distinction between service and proximity discovery-MV-PROSESWG, Feb. 13-17, 2012.

* cited by examiner

PROXIMITY SERVICE DISCOVERY USING A LICENSED FREQUENCY SPECTRUM

TECHNICAL FIELD

The present disclosure relates generally to telecommunications and, more particularly, to improved proximity service discovery.

BACKGROUND

When two mobile communication devices of a cellular network or other telecommunication system communicate with each other, their data path goes through the operator network. The data path through the network may include base stations and/or gateways. If the devices are in close proximity with each other, their data path may be routed locally through a local base station. It is also possible for two mobile devices in close proximity to establish a direct link without the need to go through a base station. Proximity-based applications and services require the discovery of mobile devices that are within proximity of each other. Proximity is determined when given proximity criteria are fulfilled. The growing demand for increased speed, throughput, and efficiency in mobile communication requires continuing improvements in wireless communication processes, systems, and devices, including those related to proximity-based applications and services.

SUMMARY

Systems, devices, and methods for improving discovery for proximity-based applications and services in mobile communication are described.

In one aspect, a base station is provided. The base station can include an information generating module and an information transmission module. The information generating module can generate control information for causing a mobile device to initiate a discovery signal transmission procedure for proximity services. The discovery signal transmission procedure can include one or more procedures allowing the mobile device to be discovered. A discovery signal can be used for allowing a mobile device to be discovered. The discovery signal can notify a discovering mobile device that the mobile device is in proximity to the discovering device. The information transmission module can transmit the control information to the mobile device.

In another aspect, a mobile device is provided. The mobile device can include an information receiving module, a control module, and a signal transmission module. The information receiving module can receive control information. The control module can initiate a discovery signal transmission procedure for proximity services based on the information receiving module receiving the control information. The discovery signal transmission procedure can include generating a discovery signal allowing the mobile device to be discovered. The discovery signal transmission procedure can include periodic generation of a discovery signal. The signal transmission module can broadcast the discovery signal.

These illustrative aspects and features are mentioned not to limit or define the invention, but to provide examples to aid understanding of the inventive concepts disclosed in this disclosure. Other aspects, advantages, and features of the present invention will become apparent after review of the entire disclosure.

DETAILED DESCRIPTION

Figure 1:
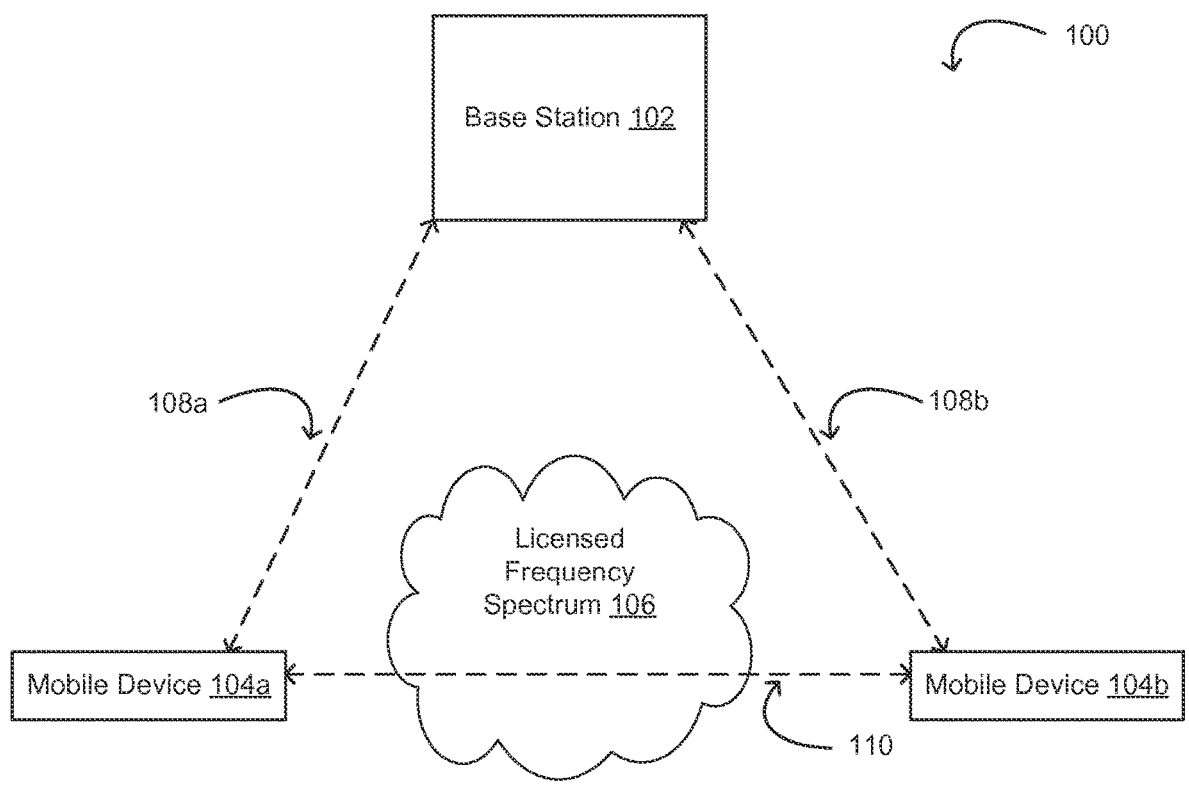
FIG. 1 is a block diagram illustrating an example telecommunication system using proximity services in a licensed frequency spectrum according to exemplary embodiments of the present invention.

Certain aspects and examples are directed to systems and methods for performing proximity-based discovery of devices using a licensed frequency spectrum in a telecommunications system. In some aspects, a base station or other network control device of the telecommunication system can manage proximity-based discovery. The base station can generate control signals or other control information that allow a mobile device to be discovered or to discover other devices in a telecommunication network. For example, a mobile device can discover other devices available for a proximity service. The mobile device can discover other mobile devices using a frequency band of a licensed frequency spectrum. A mobile device can start to discover other devices or start to be discovered by other devices based on receiving request information directing the mobile device to perform a discovery procedure. A discovery procedure (or a proximity discovery procedure) can include, (but is not limited to) a discovery signal transmission procedure and/or discovery signal detection procedure. The discovery signal transmission procedure can include (but is not limited to) broadcasting or otherwise transmitting a discovery signal that allows the mobile device to be discovered. The discovery signal detection procedure can include (but is not limited to) detecting a discovery signal from another device. The detection of the discovery signal may or may not be enough to identify the device transmitting the discovery signal.

In other aspects, a mobile device can semi-autonomously initiate a discovery signal transmission procedure after receiving allowance information notifying the mobile device that it is permitted to initiate the discovery signal transmission procedure based on a predetermined "trigger" condition and/or based on a further allowance condition being satisfied. For example, a device that is permitted and/or triggered to broadcast or otherwise transmit a discovery signal can do so using one or more resources that are predetermined or otherwise identified by the base station. Non-limiting examples of resources used for broadcasting or otherwise transmitting the discovery signal can include time, frequency, spatial layer, spreading code or sequence, etc. In some aspects, the device can periodically or non-periodically transmit the discovery signal using one or more predetermined resources. In other aspects, the device can use a deterministic algorithm to select one or more predetermined resources for transmission of the discovery signal. In other aspects, the device can randomly choose one or more resources from the predetermined resources for transmission of the discovery signal. In another example, the device can autonomously in choose the resources for transmission of the discovery signal without regard to resources being predetermined by the base station.

In other aspects, a mobile device can autonomously initiate a discovery procedure based on a trigger condition without receiving either a request information or allowance information from the base station. In additional or alternative aspects, a mobile device can discover other devices or be discovered by other devices in a telecommunication system available for communication, such as a local base station or other stationary network device, such as a desktop computer configured to communicate with mobile devices. As one example, a device operated by or for a commercial establishment, such as a retail store, restaurant, etc., may transmit a discovery signal allowing it to be discovered, so that devices operated by potential consumers can detect the discovery signal, thereby informing the user that the commercial establishment is nearby.

Performing proximity-based discovery using a licensed frequency spectrum can mitigate disadvantages associated with performing discovery using an unlicensed frequency spectrum. Unlicensed frequency bands provide a "best-effort" type of service in which the communication between devices does not include any guarantees of data delivery, quality of service level, or a certain priority. Further, systems operating in unlicensed frequency bands may not be able to provide network-based resource management that can be applied to all users of that unlicensed spectrum, as multiple systems may often use the same unlicensed spectrum. On the other hand, using a licensed frequency spectrum can allow for guaranteed performance levels, such as minimal interference problems from other devices, quality of service level, allocation of resources among devices in the network, maintenance of data throughput, etc. Performing proximity-based discovery using a licensed frequency spectrum can provide network-based radio resource management that accounts for conditions at each network node. Performing proximity-based discovery using a licensed frequency spectrum can also provide regulation by operators. Network-based radio resource management can allow for improved end-to-end experience by a user and for quality of service to be maintained. For example, performing proximity-based discovery using a licensed frequency spectrum can provide enhanced reliability and quality for establishing device-to-device communication.

As used herein, the term "discovery signal" can refer to one or more signals allowing discovery of a network device, such as a mobile device or other network device. In some aspects, a discovery signal can be broadcasted or otherwise transmitted. One or more discovery signals may be used to discover a mobile device or to allow a mobile device to be discovered.

As used herein, the term "device-to-device ("D2D") communication" can refer to a mode of communication that operates on a cellular network or other telecommunications system in which the data traffic from one mobile device to another mobile device does not pass through a centralized base station or other device in the cellular network or other telecommunications system. Data traffic may be transmitted directly from a first mobile device to a second mobile device via D2D communication. In various aspects, all, some or none of the control signaling related to the D2D packet transmission may be managed or generated by the underlying core network or base station.

D2D communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication can be used.

As used herein, the term "licensed frequency spectrum" can include a frequency spectrum for which usage is regulated by a governing agency. In some aspects, a licensed frequency spectrum can refer to an allocation of spectrum that is licensed by government regulatory authorities and where access to and use of the spectrum in a particular domain are controlled by a licensee, such as (but not limited to) a cellular carrier. Licensees of a frequency spectrum can include governmental agencies, private entities such as (but not limited to) cellular carriers, etc. For example, in the United States, a licensed frequency spectrum can include frequencies used for communication that are regulated by the Federal Communication Commission. For example, various portions of a licensed frequency spectrum can be designated for military use, public safety, and commercial services. Only the entities entitled to do so may use the frequency bands of a respective portion of a licensed frequency spectrum. Examples of commercial use can include broadband wireless use, Personal Communications Services ("PCS") cellular use, broadband radio services, etc.

As used herein, the term "proximity services" (or "ProSe") can refer to systems and methods for implementing proximity discovery and/or D2D communication in a telecommunications system. In some telecommunication networks, such as Evolved Universal Terrestrial Radio Access Network ("E-UTRAN") or Generation Partnership Project ("3GPP") Long Term Evolution ("LTE") networks, proximity services can also include establishing a communication path for routing data through an enhanced Node B ("eNB").

As used herein, the term "mobile device" can refer to an electronic device used to communicate voice and/or data via a telecommunications system, such as (but not limited to) a cellular network. Other terminology used to refer to mobile devices and non-limiting examples of such devices can include mobile station, user equipment ("UE"), access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "base station" can refer to any device or group of devices that facilitates wireless communication or otherwise provides an interface between a mobile device and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for mobile devices to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10 and/or 11), the scope of the present disclosure should not be limited in this regard. At least some aspects of the systems and methods disclosed herein may be utilized in other types of wireless communication systems.

As used herein, the term "telecommunication system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMT-Advanced"). All or a subset of the cell may be adopted by 3GPP as licensed bands (e.g., frequency band) to be used for communication between a base station, such as a Node B, and a mobile device, such as a UE. A cellular network using licensed frequency bands can include configured cells. Configured cells can include cells of which a mobile device is aware and in which it is allowed by a base station to transmit or receive information.

Proximity can be determined based on proximity criteria being fulfilled. Proximity criteria can be different for proximity discovery and proximity communication.

As used herein, the term "proximity discovery" can refer to a process for determining that a first mobile device is in proximity to a second mobile device, also referred to as Proximity Service Discovery ("ProSe Discovery").

As used herein, the term "proximity communication" can refer to a process for establishing a communication channel between a mobile device and other network devices in its proximity. The communication channel can be implemented via D2D communication or via routing through a local base station, also referred to as Proximity Service Communication ("ProSe Communication").

As used herein, the term "trigger condition" can refer to a condition to which a mobile device is required to respond by initiating a proximity discovery procedure, such as (but not limited to) detecting a discovery signal and/or broadcasting or otherwise transmitting a discovery signal. Examples of trigger conditions can include (but are not limited to) a schedule for initiating a proximity discovery procedure or initiating a proximity discovery procedure automatically in response to detecting another network device. Examples of trigger conditions can also include (but are not limited to) a schedule for initiating a discovery signal broadcasting or transmitting or initiating a discovery signal broadcasting or transmitting automatically in response to detecting another network device.

As used herein, the term "allowance condition" can refer to a condition to which a mobile device is allowed to respond by initiating a proximity discovery procedure. In some aspects, a mobile device can be configured to initiate detection of a trigger condition in response to an allowance condition. In other aspects, a mobile device may generate a prompt for display at an interface. The prompt may request input from a user regarding whether to initiate proximity discovery signal transmission procedure. The mobile device may initiate a proximity discovery signal transmission procedure in response to user input requesting the initiation of proximity discovery signal transmission procedure.

Detailed descriptions of these aspects are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects but, like the illustrative aspects, should not be used to limit the present invention.

FIG. 1 is a block diagram illustrating an example telecommunication system 100 using proximity services in a licensed frequency spectrum 106 according to one aspect.

The telecommunication system 100 can include a base station 102 and two or more mobile devices 104a, 104b. The base station 102 can respectively communicate with the mobile devices 104a, 104b via the respective communication channels 108a, 108b. The communication channels 108a, 108b can be established via any suitable method for communicating between a base station and a mobile device in a service coverage area serviced by the base station.

The D2D communication link 110 can provide a direct link between the mobile devices 104a, 104b. The D2D communication link 110 can enable the mobile devices 104a, 104b to exchange data without routing the data through base station 102 or other infrastructure of the telecommunication system 100. In some aspects, the mobile devices 104a, 104b can establish a D2D communication link 110 via the licensed frequency spectrum 106, as depicted in FIG. 1. In other aspects, the mobile devices 104a, 104b can establish a D2D communication link 110 via a suitable unlicensed frequency spectrum. Non-limiting examples of a communication link 110 via an unlicensed frequency spectrum include a WLAN link, a Bluetooth link, etc. Specific examples of a particularly advantageous methodology for establishing a D2D link are described in commonly-assigned U.S. patent application Ser. No. 13/408,910, titled "Allocating and Determining Resources for a Device-to-Device Link," by Khoshnevis et al., which is hereby incorporated by reference in its entirety and for all purposes. Establishing the D2D communication link 110 may include determining that the mobile devices 104a, 104b are in sufficient proximity to one another.

Figure 2:
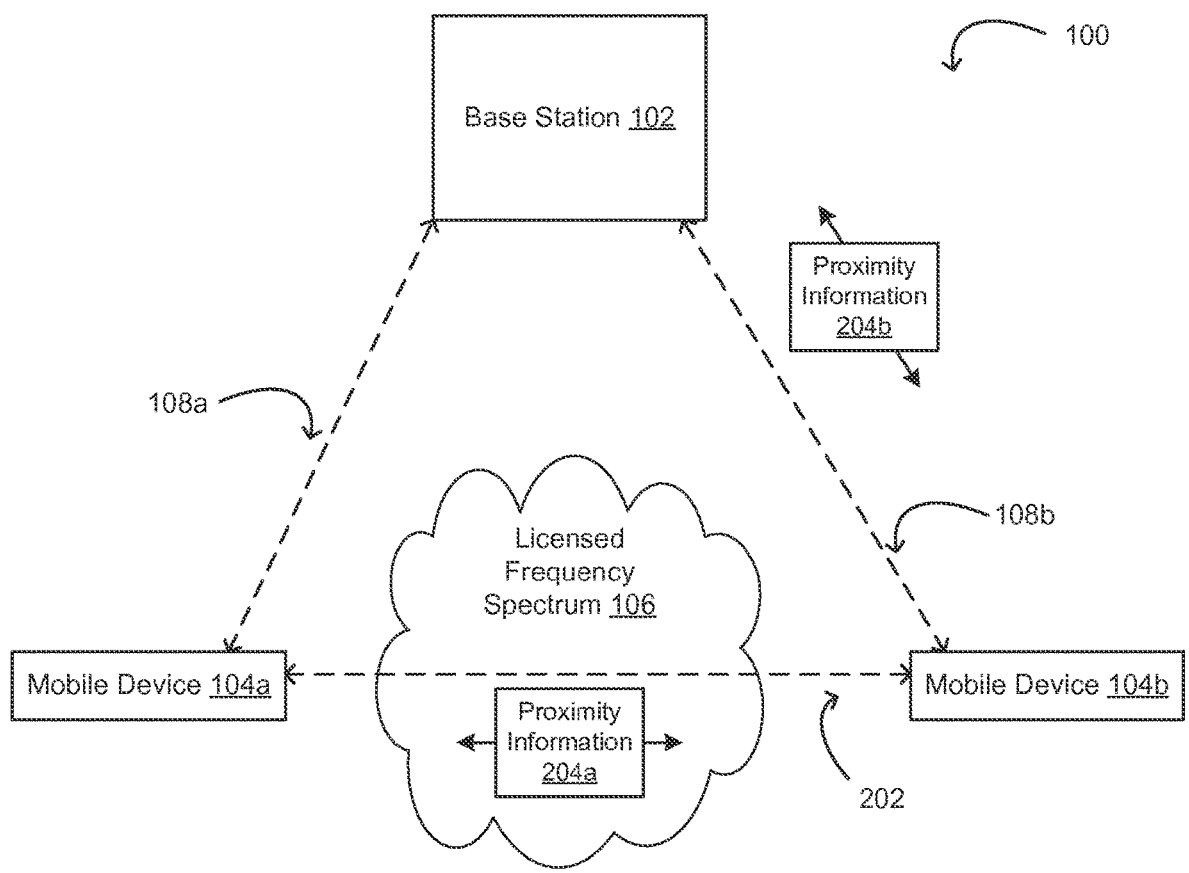
FIG. 2 is a block diagram illustrating the example telecommunication system using proximity service discovery in a licensed frequency spectrum according to exemplary embodiments of the present invention.

FIG. 2 is a block diagram illustrating the telecommunication system 100 using proximity service discovery via the licensed frequency spectrum 106.

Determining that two or more peers are in sufficient proximity to one another (i.e. proximity discovery) can include exchanging information via multiple protocol layers. A peer can include (but is not limited to) a device communicating with another peer device and/or an application communication with another application. Each layer may have different lengths or types of identity information for different peers. A discovering or discovered peer can be a mobile device, a base station, a network, a server, or an application, etc. The layer used to identify a discovered peer can determine which peer is a discovering or discovered peer. The layer used for a discovery can determine which a mobile device, a base station, a network, a server, or an application is a discovering or discovered peer.

In some aspects, discovery of a mobile device can include using a direct link 202 to communicate proximity information 204a between discovered mobile device, such as the mobile device 104a, and the discovering mobile device, such as the mobile device 104b. The direct link 202 can be established via the licensed frequency spectrum 106. The direct link 202 can include resources of the telecommunication system 100 that are allocated to or otherwise used by a device, such as the mobile device 104a, for broadcasting or otherwise transmitting a discovery signal. For example, the mobile device 104b can continuously scan frequencies of the licensed frequency spectrum 106 for discovery signal broadcast by the mobile device 104a. In other aspects, discovery of a mobile device can include communicating proximity information 204b via a communication channel 108b between the base station 102 and the discovering mobile device 104b. In other aspects, discovery of a mobile device can include using a communication channel 108a between a base station 102 and the discovering mobile device 104a.

In some aspects, the base station 102 can determine the geographic location of mobile devices 104a, 104b using triangulation of signals or other network-based methods. For example, devices in the telecommunication system 100 may determine the location of the mobile device based on the delay of communication signals sent between the mobile device and the closest wireless access point(s), base station (s), etc. In such cases, the geographical position of the mobile device is determined through various techniques like triangulation, time difference of arrival ("TDOA") or Enhanced Observed Time Difference ("E-OTD"). Those skilled in the art will appreciate that any other location-based service technology may be used. Examples of such other technologies include: Near LBS ("NLBS"), in which local-range technologies such as Bluetooth, WLAN, infrared and/or RFID/Near Field Communication technologies are used to determine the position of a communication device; the use of operator-independent location data provided in telecommunication signaling protocols such as SS7; and Local Positioning Systems such as Co-Pilot Beacon for COMA networks, Bluetooth, UWB, RFID, Wi-Fi and WiMAX.

In other aspects, the base station 102 can determine the location of mobile devices 104a, 104b based on location information received from the mobile devices. Location information can be generated using global positioning systems ("GPS") or other location-based services. For example, location based services may include a GPS chip and associated software or firmware for monitoring the location of the caller device using a global positioning system. Additionally or alternatively, the location-based services may include software used to monitor signals generated and/or received by the mobile device 104a when it communicates with other devices (e.g. wireless access points, base stations, etc.) in the telecommunication system 100. The signals may provide or may be used to provide an indication of the geographical location of the mobile device 104a at a particular time, such as by triangulation or techniques like TDOA, E-OTD, etc.

Figure 3:
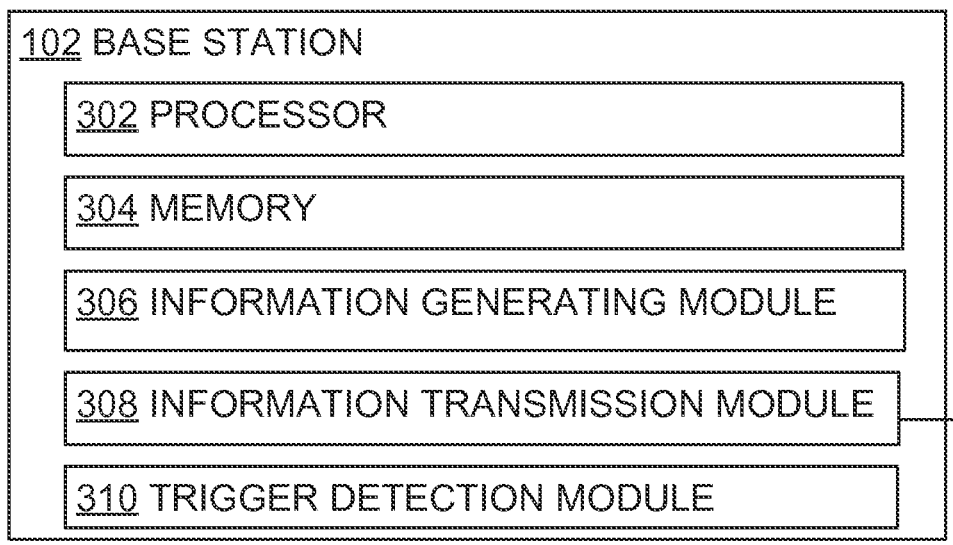
FIG. 3 is a block diagram depicting an example base station for controlling proximity service discovery of mobile devices in a licensed frequency spectrum according to exemplary embodiments of the present invention.

FIG. 3 is a block diagram depicting an example base station 102 for controlling proximity service discovery of mobile devices 104a, 104b in a licensed frequency spectrum.

To implement the functionality described herein, the base station 102 can include a processor 302 that can execute code stored on a computer-readable medium, such as a memory 304, to cause various modules in the base station 102 to control or otherwise manage proximity service discovery of mobile devices in the telecommunication system 100. Non-limiting examples of a processor 302 include a microprocessor, a peripheral interface controller ("PIC"), an application-specific integrated circuit ("ASIC"), a field-programmable gate array ("FPGA"), or other suitable processor. The processor 302 may include one processor or any number of processors.

The processor 302 can access instructions stored in memory 304. The memory 304 may be any non-transitory computer-readable medium capable of tangibly embodying instructions and can include electronic, magnetic, or optical devices. Examples of the memory 304 include random access memory ("RAM"), read-only memory ("ROM"), magnetic disk, an ASIC, a configured processor, or other storage device. Instructions can be stored in the memory 304 as executable code. The instructions can include processor-specific instructions generated by a compiler and/or an interpreter from code written in any suitable computer-programming language, such as C, C++, C #, Visual Basic, Java, Python, Perl, JavaScript, and ActionScript.

The base station 102 can also include an information generating module 306. The information generating module 306 can include any device or group of devices and/or any suitable software for generating signals or data to be transmitted via the antenna 309 or any other suitable transmission device. The processor 302 can control the information generating module 306 to generate control signals or other control information to be transmitted to the mobile devices 104a, 104b. The control signals or other control information can control or manage the discovery of mobile devices in the telecommunication system 100, as explained in more detail below with respect to FIGS. 5-13.

The base station 102 can also include an information transmission module 308. The information transmission module 308 can include any device or group of devices and/or any suitable software for preparing signals for transmission to mobile devices 104a, 104b via the antenna 309 and/or other suitable devices. Preparing signals for transmission to mobile devices 104a, 104b via the antenna 309 can include generating control signals and modulating the control signals with data, such as control information, generated by the information generating module 306. Any suitable modulation technique can be used to modulate the carrier signals, such as (but not limited to) phase shift modulation ("PSK"), quadrature amplitude modulation ("QAM"), etc.

The base station 102 can also include a trigger detection module 310. The trigger detection module 310 can include any device or group of devices and/or any suitable software for detecting a trigger condition in the telecommunication system 100, as described below with respect to FIGS. 5-13.

The example configuration for the base station 102 is provided to illustrate configurations of certain aspects. Other configurations may of course be utilized. Although the information generating module 306, the information transmission module 308, and the trigger detection module 310 are depicted in FIG. 3 and described herein as separate physical or logical modules for ease of reference, other implementations are possible. In additional or alternative aspects, two or more of the information generating module 306, the information transmission module 308, and/or the trigger detection module 310 can be implemented via common devices, groups of devices, and/or software engines. Other aspects and alternative embodiments for the base station 102 are described in the above-referenced commonly-assigned U.S. patent application Ser. No. 13/408,910, titled "Allocating and Determining Resources for a Device-to-Device Link," by Khoshnevis et al., and are incorporated herein by reference.

Figure 4:
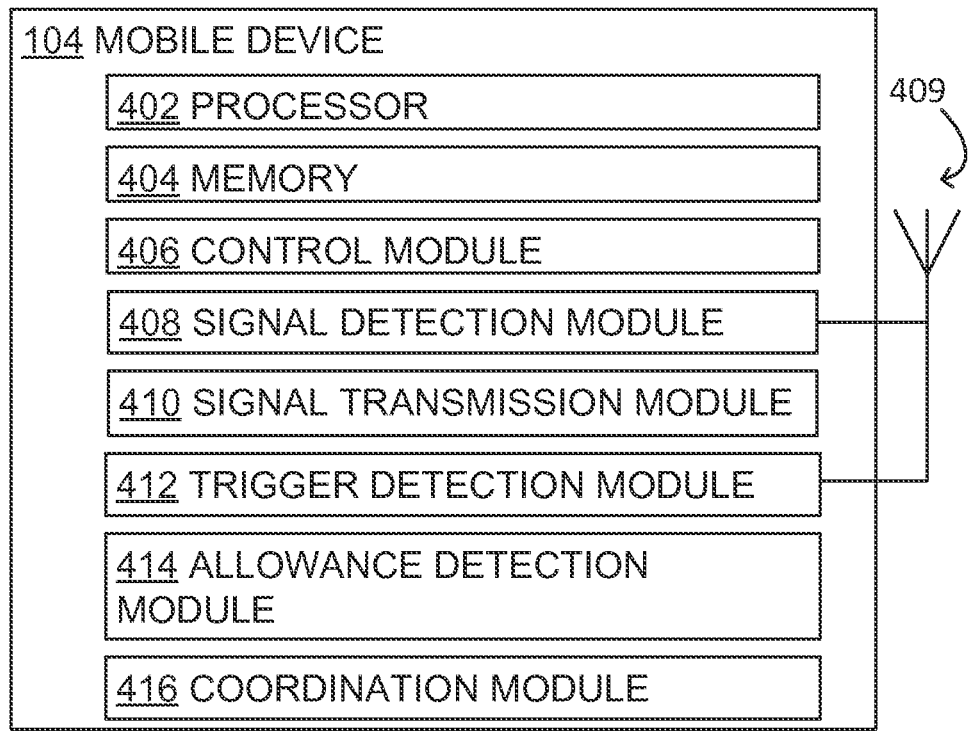
FIG. 4 is a block diagram depicting an example mobile device for performing proximity service discovery of other mobile devices in a licensed frequency spectrum according to exemplary embodiments of the present invention.

FIG. 4 is a block diagram depicting an example mobile device 104 for performing proximity service discovery.

The mobile device 104 includes a processor 402 that can execute instructions stored on a computer-readable medium, such as a memory 404, to cause the mobile device 104 to control or otherwise manage proximity service discovery of mobile devices 104a, 104b. Non-limiting examples of a processor 402 include a microprocessor, a peripheral interface controller ("PIC"), an application-specific integrated circuit ("ASIC"), a field-programmable gate array ("FPGA"), or other suitable processor. The processor 402 may include one processor or any number of processors.

The processor 402 can access instructions stored in memory 404. The memory 404 may be any non-transitory computer-readable medium capable of tangibly embodying instructions and can include electronic, magnetic, or optical devices. Examples of the memory 404 include random access memory ("RAM"), read-only memory ("ROM"), magnetic disk, an ASIC, a configured processor, or other storage device. Instructions can be stored in the memory 404 as executable code. The instructions can include processor-specific instructions generated by a compiler and/or an interpreter from code written in any suitable computer-programming language, such as C, C++, C #, Visual Basic, Java, Python, Perl, JavaScript, and ActionScript.

The mobile device 104 can also include a control module 406. In some aspects, the control module 406 can generate a discovery signal to be broadcasted or otherwise transmitted to other network devices, as explained in more detail below with respect to FIGS. 5-13. In additional or alternative aspects, the base station 102 can trigger a broadcast or other transmission of the discovery signal by the mobile device 104. The control module 406 of the mobile device 104 can generate the discovery signal or other discovery signal periodically after the base station 102 triggers the mobile device 104.

The mobile device 104 can also include a signal detection module 408. The signal detection module 408 can receive signals via the antenna 409 or other device from other devices in the telecommunication system 100. The signal detection module 408 can receive signals via the antenna 409 or other device from other devices in the telecommunication system 100. The signal detection module 408 can demodulate or otherwise extract data from the received signals.

The mobile device 104 can also include a signal transmission module 410. The signal transmission module 410 can include a transmitter component and a receive component. The signal transmission module 410 can prepare signals for transmission to the base station 102 or to other mobile devices 104a, 104b via the antenna 409. Preparing signals for transmission can include, for example, modulating carrier signals to transmit the data. Any suitable modulation technique can be used to modulate the carrier signals, such as (but not limited to) phase shift modulation ("PSK"), quadrature amplitude modulation ("QAM"), etc. The signal transmission module 410 can broadcast or otherwise transmit signals via the licensed frequency spectrum 106.

The mobile device 104 can also include one or more of a trigger detection module 412, an allowance detection module 414, and/or a coordination module 416. The trigger detection module 412, the allowance detection module 414, and/or the coordination module 416 can provide additional functionality allowing the mobile device to operate in an autonomous or semi-autonomous mode for proximity discovery, as described in detail below with respect to FIGS. 5-13.

Although the control module 406, the signal detection module 408, the signal transmission module 410, the trigger detection module 412, the allowance detection module 414, and the coordination module 416 are depicted in FIG. 4 and described herein as separate physical or logical modules for ease of reference, other implementations are possible. In additional or alternative aspects, two or more of the control module 406, the signal detection module 408, the signal transmission module 410, the trigger detection module 412, the allowance detection module 414, and/or the coordination module 416 can be implemented via common devices, groups of devices, and/or software engines.

Figure 5:
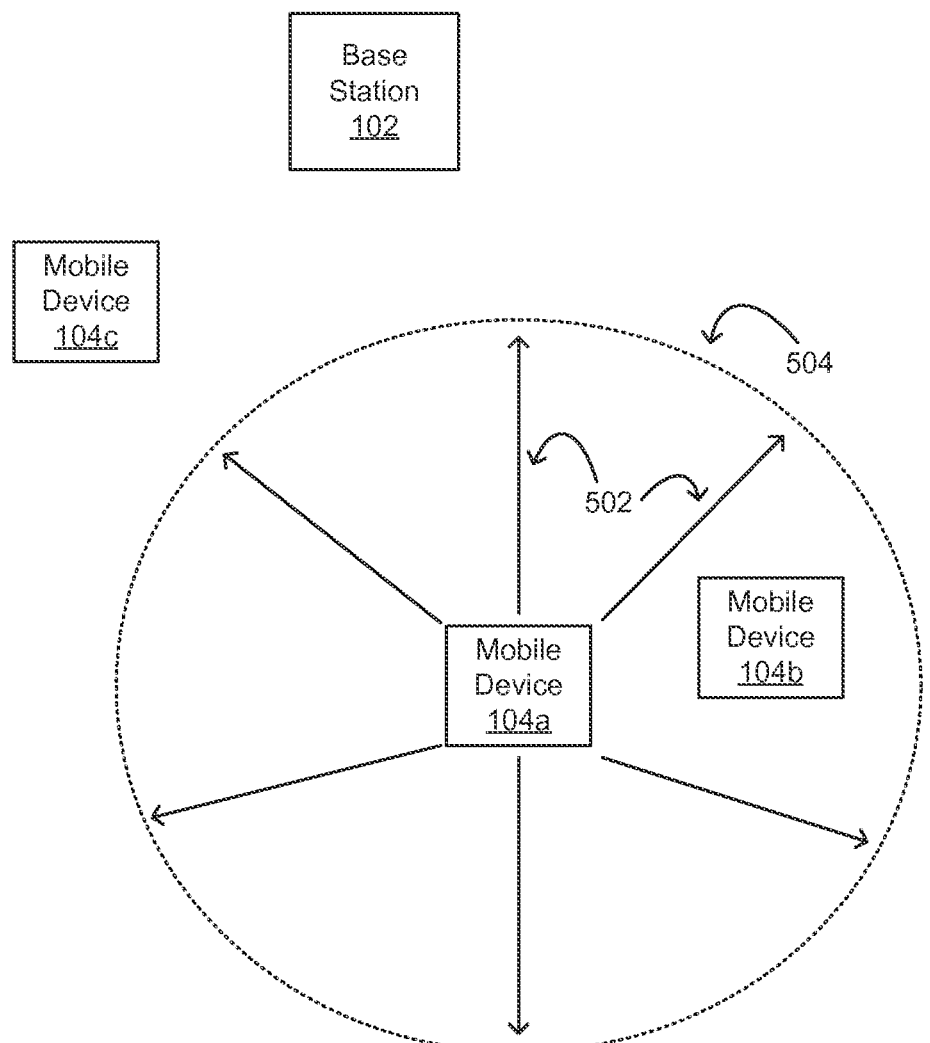
FIG. 5 is a modeling diagram illustrating an example of broadcasting or otherwise transmitting a discovery signal according to exemplary embodiments of the present invention.

FIG. 5 is a modeling diagram illustrating an example of broadcasting or otherwise transmitting a discovery signal 502. Proximity based discovery can include using a physical layer signal, such as a discovery signal 502, to check reachability and proximity between a discovered mobile device 104a and a discovering mobile device 104b. The physical layer signal can be a radio signal from a discovered mobile device 104a that can be discovered using a discovery signal transmission procedure.

For example, a mobile device 104a that is capable of being discovered can transmit or broadcast the discovery signal 502, such as a radio signal broadcast, via the licensed frequency spectrum 106. By broadcasting the discovery signal 502 in this manner, the mobile device 104a can be discovered by a discovering mobile device within a sufficient proximity of the discovered mobile device 104a to receive or otherwise detect the discovery signal 502. A discovering mobile device 104b can be within a radius 504 in which the discovery signal 502 can be detected and can thereby be located within a sufficient proximity of a discovered mobile device 104a. A mobile device 104c can be located outside the radius 504 in which the discovery signal 502 can be detected, preventing the mobile device 104c from discovering the mobile device 104a. In additional or alternative aspects, the discovered mobile device 104a can be discovered by a base station that senses the discovery signal 502. Examples of discovery signal 502 can include (but are not limited to), a proximity services sounding signal, a proximity services beacon, an LTE uplink sounding reference signal, an LTE downlink reference signal, etc. It is to be understood that not all three devices 104a, 104b, and 104c need be mobile.

In some aspects, the discovery signal 502 may provide information and/or structure to identify a mobile device 104a. Such information can include, for example, a unique identifier assigned to the mobile device 104a. In other aspects, the discovery signal 502 may provide information and/or structure to identify a type of discovery to be used by the mobile devices 104a, 104b. Non-limiting examples of types of discovery can include physical layer discovery, network access layer discovery, and application services layer discovery.

In other aspects, the discovery signal 502 may provide information and/or structure to identify an estimated channel quality or channel state of a communication channel that can be used as the D2D communication channel 110. For example, the discovery signal 502 can include a reference signal to be used to estimate a channel quality (e.g., reception power, estimated path loss, estimated signal-to-noise ratio, estimated reception quality, pre-coding matrixes, estimated rank used for spatial multiplexing, etc.). Estimating a channel quality can include transmitting a known signal, such as a reference signal, by a transmitter, receiving the reference signal by a receiver, and performing channel estimation algorithm such as (but not limited to) mean squared error ("MSE") estimation on the received signal.

Figure 6:
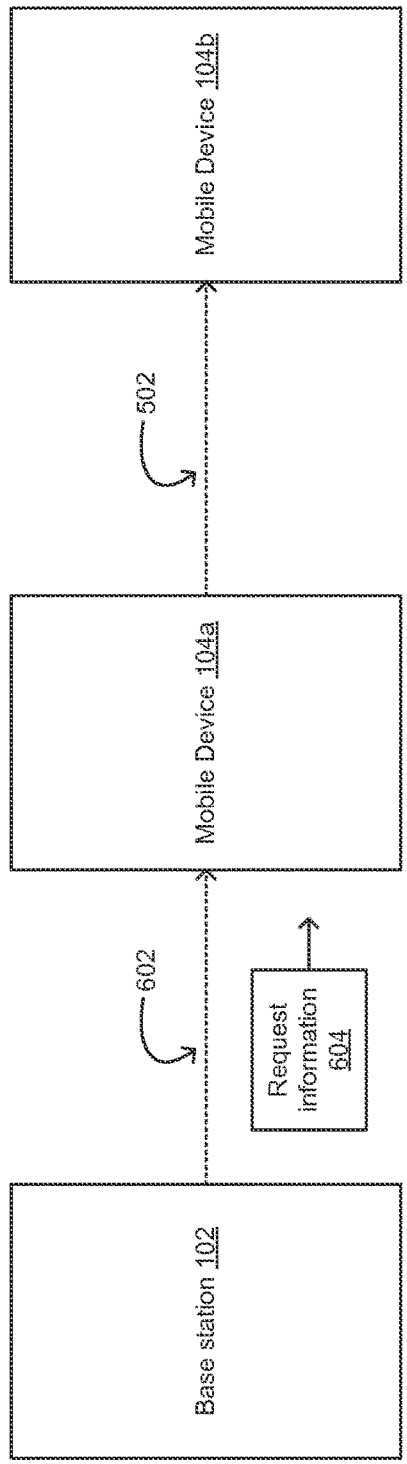
FIG. 6 is a modeling diagram illustrating an example flow of communications for network-controlled proximity service discovery of mobile devices according to exemplary embodiments of the present invention.
Figure 7:
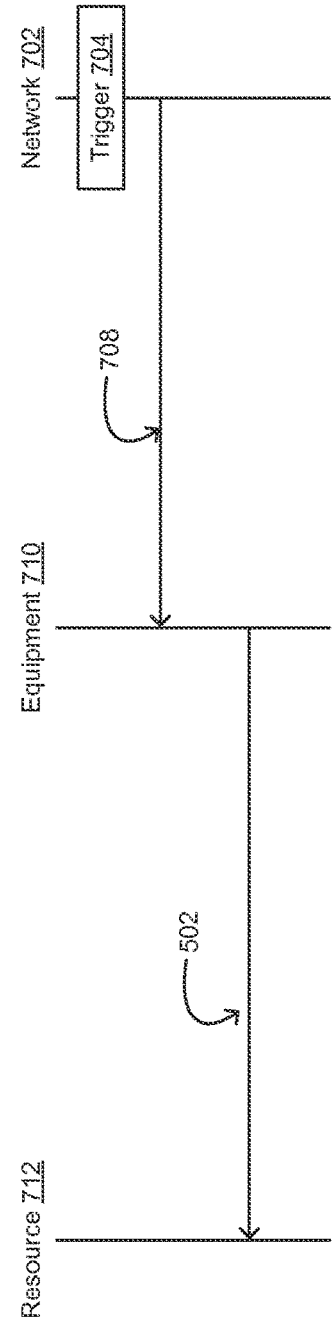
FIG. 7 is a modeling diagram illustrating an example flow of communications for network-controlled proximity service discovery of network devices according to exemplary embodiments of the present invention.

In some aspects, a base station 102 or other network control device(s) of a telecommunication system 100 can control the discovery process for initiating proximity-based communications. FIGS. 6 and 7 are modeling diagrams illustrating an example flow of communications for proximity service discovery of mobile devices 104a, 104b or other network devices controlled by the base station 102 or other network control devices. The base station 102 or other network control device(s) can control radio resource usage and can trigger or otherwise cause the mobile device 104a to transmit a discovery signal 502. The mobile device 104a can broadcast or otherwise transmit the discovery signal to another mobile device 104b via one or more frequencies of the licensed frequency spectrum 106.

As depicted in FIG. 6, the base station 102 can transmit control information 602 to a mobile device 104a. The information generating module 306 can generate request information 604 to be transmitted using the control information 602. The information transmission module 308 can generate the control information 602. In some aspects, the information transmission module 308 can modulate a carrier signal with the control information 602 that includes the request information 604. The information transmission module 308 can transmit the control information 602 to the mobile device 104a via any suitable device, such as the antenna 309.

Non-limiting examples of request information 604 (also referred to as an order for discovery signal, a request for discovery signal, a trigger for discovery signal, a command message, etc.) can include, but are not limited to, a broadcast system information message, a radio resource control ("RRC") message, a media access control ("MAC") layer message, a physical layer signaling such as physical downlink control channel ("PDCCH") signaling, a non-access stratum ("NAS") layer dedicated signaling message, a paging message, etc. NAS layer signaling can be sent from a mobility management entity ("MME") to a mobile device by using signals transmitted from a base station to the mobile device.

In additional or alternative aspects, the request information 604 can be carried on a paging channel or a broadcast channel. The request information 604 may include information to identify the specific device to be discovered. For example, the request information 604 can include a unique device identifier associated with a mobile device 104a to initiate a proximity discovery signal transmission procedure.

In some aspects, the request information 604 can direct a mobile device 104a to broadcast or otherwise transmit a discovery signal 502 such that the mobile device 104a can be discovered only by the mobile device 104b or can establish a D2D communication channel only with the mobile device 104b. Information used for generating specific discovery signal may be provided by the request information 604. In other aspects, the discovery signal 502 can be encrypted, scrambled, or encoded such that a specific device can detect the discovery signal.

The base station 102 can determine whether the mobile device 104a initiates the proximity discovery signal transmission procedure based on an internal decision, which may for example be based on any information related to proximity services or other information unrelated to proximity service. Non-limiting examples, of information related to proximity services can include cell conditions such as the number of users, user density throughout the cell, mobility of the users, etc. The proximity discovery signal transmission procedure may include, for example, generating the discovery signal 502, scheduling a broadcast or other transmission of the discovery signal 502, transmitting or otherwise broadcasting the discovery signal 502, detecting a triggering condition, detecting an allowance condition, ceasing generation or transmission of the discovery signal 502, etc. In some aspects, information for triggering and/or resource allocation for the discovery signal 502 is included in the request information 604. Information for triggering and/or resource allocation can include identification of a trigger condition and/or allowance condition. The request information can direct the mobile device 104a to initiate a proximity discovery signal transmission procedure only after detecting the trigger condition and/or based on the allowance condition being satisfied. For example, a request information that is a physical layer message can include one or more bits to direct a mobile device 104a to initiate the proximity discovery signal transmission procedure and one or more additional bits describing the information for triggering and/or resource allocation. In another example, a request information 604 that is a higher layer signaling (e.g., broadcast system information, RRC dedicated signaling, or NAS dedicated signaling) can include one or more information elements to direct a mobile device 104a to initiate the proximity discovery signal transmission procedure. The one or more information elements may include resource allocation and/or a sequence index for the discovery signal 502. In another example, the request information 604 can include a type of discovery signal transmission, periodicity of discovery signal transmission, time-frequency resource for discovery signal transmission, and/or sequence indexes of a discovery signal. Non-limiting examples of a type of discovery signal transmission can include periodic discovery signaling, aperiodic discovery signaling, conditional periodic discovery signaling.

In additional or alternative aspects, the base station 102 may use information transmitted from the mobile device 104*a* to the base station 102 to decide whether to command the mobile device 104*a* to initiate the proximity discovery signal transmission procedure. A non-limiting example of such mobile-device-assisted information is a service request for a proximity service. For example, the NAS layer of a mobile device using a UMTS wireless telecommunication protocol can request that the AS ("access stratum") layer of the mobile device send a request signal related to the discovery signal 502. The AS layer of the mobile device can send the request signal to the base station 102. Another non-limiting example can include the NAS layer of the mobile device sending a service request to the NAS of the base station 102 or other network control device. The NAS of the base station 102 can transmit a message to AS layer of the base station 102 requesting that the base station 102 transmit the request information 604 the mobile device 104*a*. Non-limiting examples of AS layer signaling can include, but are not limited to, a broadcast system information message, a radio resource control ("RRC") message, a media access control ("MAC") layer message, a physical layer signaling such as physical downlink control channel (PDCCH) signaling.

In some aspects, the control information 602 can be transmitted via dedicated NAS-layer signaling. The control information 602 can be transmitted to a mobile device 104*a* by using signals transmitted directly from the base station 102 to the mobile device 104*a*. In other aspects, the control information 602 can be transmitted via RRC signaling. The control information 602 can be transmitted from base station 102 to a mobile device 104*a* via broadcasting and/or dedicated signaling.

The signal detection module 408 of the mobile device 104*a* can demodulate or otherwise extract the request information 604 from the control information 602. The control module 406 can receive the request information 604 from the signal detection module 408. The control module 406 can initiate a proximity discovery signal transmission procedure in response to receiving the request information 604. Initiating the proximity discovery signal transmission procedure can include broadcasting or otherwise transmitting a discovery signal 502. The signal transmission module 410 can generate the discovery signal 502 in response to the request information 604. The signal transmission module 410 can generate discovery signal 502. The signal transmission module 410 can generate a discovery signal 502. For example, the signal transmission module 410 can modulate a carrier signal to include discovery information, thereby generating a discovery signal 502. The signal transmission module 410 can initiate broadcasting or otherwise transmitting the discovery signal 502 in response to the request information 604. The signal transmission module 410 can broadcast or otherwise transmit the discovery signal 502 via the antenna 409. The discovery signal 502 can be transmitted via one or more frequencies of the licensed frequency spectrum 106. The mobile device 104*b* can receive or otherwise detect the discovery signal 502, thereby discovering that the mobile device 104*a* is in proximity of the mobile device 104*b*.

Another example flow of communications for network-controlled proximity service discovery is depicted in FIG. 7. A network 702 can control discovery of a resource 712 by equipment 710. The network 702 can include any network control device such as (but not limited to) the base station 102. The equipment 710 can include any device configured to initiate a discovery signal transmission procedure, such as (but not limited to) a mobile device 104*a*. The resource 712 can include any device or group of devices configured to detect a discovery signal 502, such as (but not limited to) a mobile device 104*b*.

The equipment 710 can broadcast or otherwise transmit the discovery signal 502 based on receiving an order 708. In some aspects, the equipment 710 can only initiate discovery after receiving the order 708. A non-limiting example of an order 708 can include control information 602 and/or request information 604.

In additional or alternative aspects, the equipment 710 can commence periodically broadcasting or otherwise transmitting the discovery signal 502 after receiving the order 708. The equipment 710 can cease periodically broadcasting or otherwise transmitting the discovery signal 502 after receiving an additional order directing the equipment 710 to cease discovery.

Figure 8:
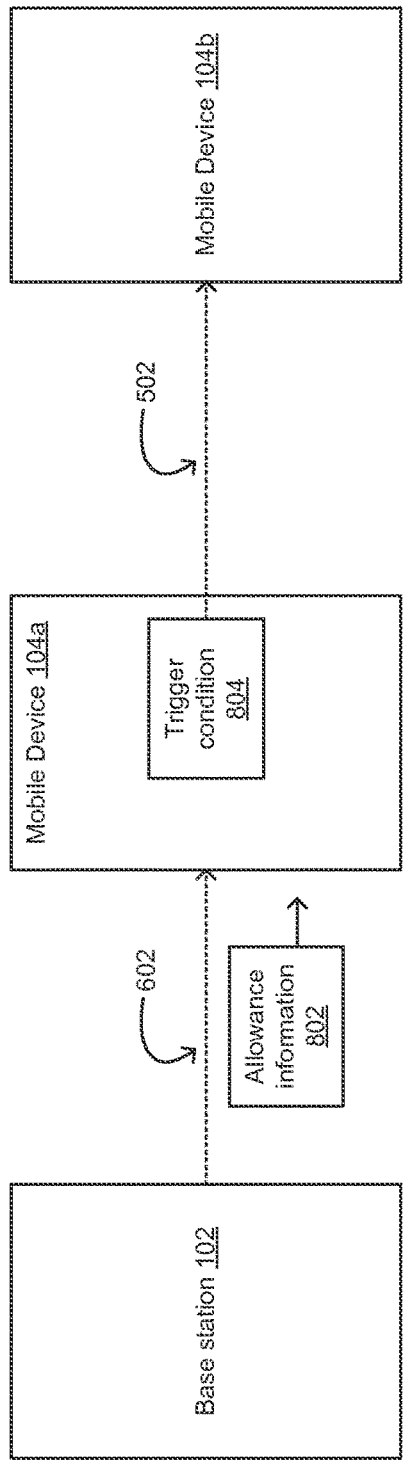
FIG. 8 is a modeling diagram illustrating an example flow of communications for a mobile device semi-autonomously initiating a proximity service discovery signal transmission procedure according to exemplary embodiments of the present invention.
Figure 9:
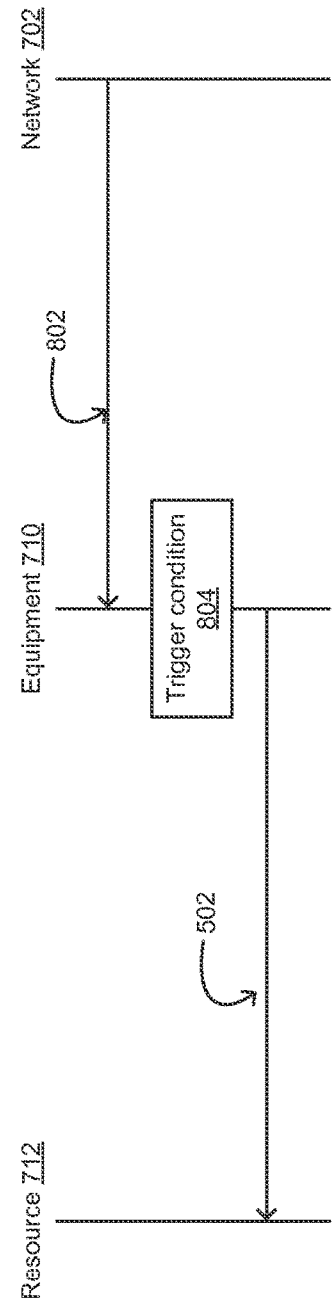
FIG. 9 is a modeling diagram illustrating an example flow of communications for a network device semi-autonomously initiating a proximity service discovery signal transmission procedure according to exemplary embodiments of the present invention.

In additional or alternative aspects, a mobile device can semi-autonomously initiate proximity service discovery signal transmission procedure in response to receiving allowance information from a base station or other network control device. FIGS. 8-9 are modeling diagrams illustrating an example flow of communications for a mobile device 104*a* or other network device semi-autonomously initiating a proximity service discovery signal transmission procedure. As depicted in FIG. 8, the base station 102 or other network control devices can control radio resource usage via allowance information 802 that is transmitted using control information 602. A mobile device 104*a* can initiate a discovery signal transmission procedure to broadcast or otherwise transmit the discovery signal 502. The base station 102 can decide whether transmitting of the discovery signal by a mobile device 104*a* is allowed. The base station 102 can decide whether and when to communicate allowance information 802 to the mobile device 104*a*. ProSe-enabled mobile devices or other network devices can be configured whether to use a proximity service by the allowance information 802.

The base station 102 can transmit the control information 602 to a mobile device 104*a*. The information generating module 306 can generate allowance information 802 to be transmitted using the control information 602. Non-limiting examples of allowance information 802 can include, but are not limited to, a broadcast system information message, a radio resource control message, a media access control layer message, or a physical layer message. The information transmission module 308 can generate the control information 602 including the allowance information 802. The information transmission module 308 can transmit the control information 602 to the mobile device 104*a* via the antenna 309.

The signal detection module 408 of the mobile device 104*a* can demodulate or otherwise extract the allowance information 802 from the control information 602. The allowance information 802 can direct the mobile device 104*a* to initiate the proximity discovery signal transmission procedure. The allowance information 802 can direct the mobile device 104*a* to generate the discovery signal if the discovery signal transmission has been triggered or scheduled. The processor 402 of the mobile device 104*a* can receive the allowance information 802. The processor 402 of the mobile device 104*a* can control the trigger detection module 412 to detect a trigger condition 804 in response to receiving the allowance information 802.

In some aspects, a trigger condition 804 can be based on a schedule for transmitting the discovery signal 502. The trigger detection module 412 can execute a scheduling algorithm to determine whether to generate the discovery signal. In other aspects, the trigger condition 804 can correspond to the receipt of the allowance information 802. The mobile device 104a can generate and transmit the discovery signal 502 based on the allowance information 802 notifying the mobile device 104a that it is permitted to send the discovery signal 502. For example, the mobile device 104a may be configured to send the discovery signal 502 at a predefined timing as long as it is allowed. This configuration can be done at the time of subscription or by the signaling from the base station 102 or other network control device(s). In other aspects, the mobile device 104a can generate and transmit the discovery signal 502 based on an internal trigger. For example, an AS layer of the mobile device 104a can trigger the transmission of the discovery signal 502 in response to a request from a upper layer (e.g., a NAS or application layer) of the mobile device 104a. The higher layer signaling can include the case that a user manually set the proximity service, the case of a service request of the application layer, etc. In other aspects, the trigger condition 804 can include the mobile device 104a discovering the mobile device 104b. The mobile device 104a can transmit the discovery signal 502 in response to discovering the mobile device 104b. Other trigger conditions will occur to those of ordinary skill in the art.

The mobile device 104a can generate discovery signal 502 to be broadcasted or otherwise transmitted as described above with respect to FIG. 6.

Another example flow of communications for a mobile device semi-autonomously initiating a proximity service discovery signal transmission procedure is depicted in FIG. 9. The network 702 can provide allowance information 802 to equipment 710. The equipment 710 can detect the trigger condition 804 in response to receiving the allowance information 802. The equipment 710 can broadcast or otherwise transmit the discovery signal 502 based on detecting the trigger condition 804. In additional or alternative aspects, the equipment 710 can commence periodically broadcasting or otherwise transmitting the discovery signal 502 after detecting a trigger condition 804. The equipment 710 can cease periodically broadcasting or otherwise transmitting the discovery signal 502 after detecting a stop condition.

Figure 10:
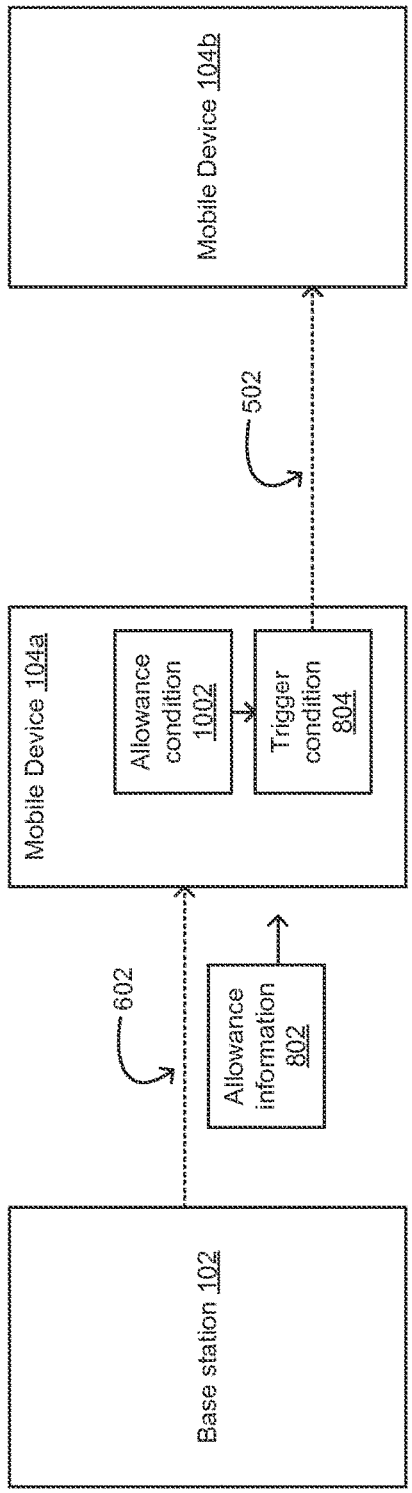
FIG. 10 is a modeling diagram illustrating an alternative example of a flow of communications for a mobile device semi-autonomously initiating a proximity service discovery signal transmission procedure according to exemplary embodiments of the present invention.
Figure 11:
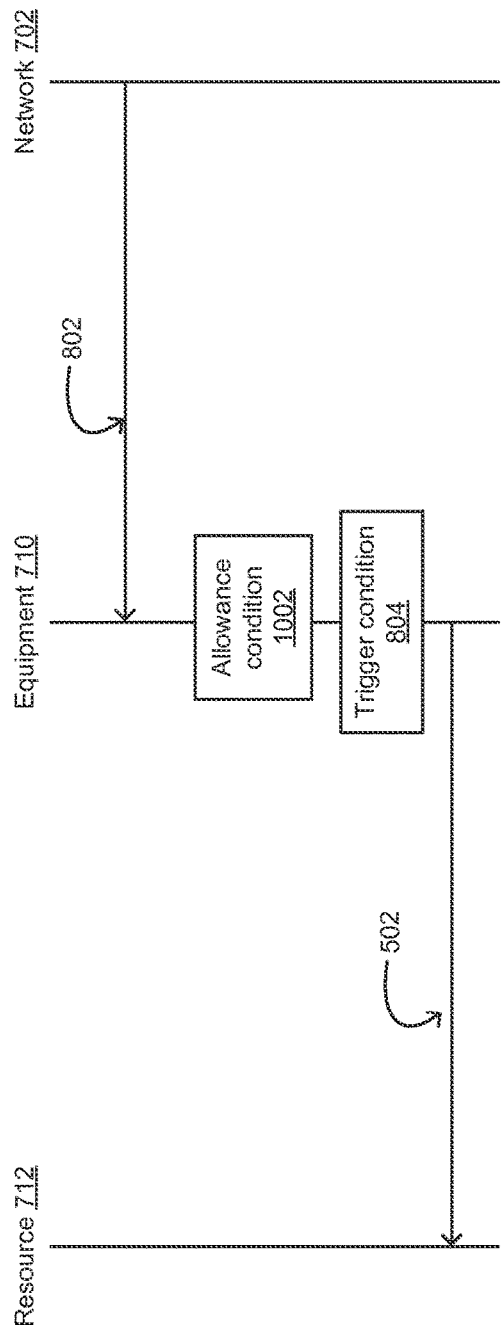
FIG. 11 is a modeling diagram illustrating an alternative example of a flow of communications for a network device semi-autonomously initiating a proximity service discovery signal transmission procedure according to exemplary embodiments of the present invention.

In additional or alternative aspects, the base station 102 and the mobile device 104a can control radio resource usage. FIGS. 10-11 are modeling diagrams illustrating an example flow of communications in which the base station 102 or other network control device and the mobile device 104a or other network device can control radio resource usage. The mobile device 104a can also initiate the proximity service discovery signal transmission procedure.

As depicted in FIG. 10, the base station 102 can transmit control information 602 including allowance information 802 to the mobile device 104a, as described above with respect to FIG. 8. The allowance information 802 can direct the mobile device 104a to generate the discovery signal 502 in response to detecting a trigger condition 804 and an allowance condition 1002. The trigger detection module 412 can be configured to cause the mobile device 104a to detect the trigger condition 804. The allowance detection module 414 can be configured to cause the mobile device 104a to detect the allowance condition 1002.

Non-limiting examples of an allowance condition 1002 can include one or more of detection of network coverage provided by the base station 102, detection of the signal powers of other mobile devices, absence of a certain signal, a predetermined/configured retry period, a determination of whether the mobile device attaches to the network or the base station, a determination of whether the mobile device is out of a range of network coverage, a determination of whether the mobile device detects a signal power exceeding a threshold on a certain time and/or frequency and/or code resource, any expiration of a timer after sending the latest discovery signal, etc. The mobile device 104a can generate discovery signal 502 as described above with respect to FIG. 6.

Another example flow of communications for a mobile device semi-autonomously initiating a proximity service discovery signal transmission procedure is depicted in FIG. 11. The network 702 can provide allowance information 802 to equipment 710. The equipment 710 can monitor the allowance condition 1002 in response to receiving the allowance information 802. The equipment 710 can detect the trigger condition 804 based on the allowance condition 1002 being satisfied. The equipment 710 can broadcast or otherwise transmit the discovery signal 502 based on detecting the trigger condition 804. In additional or alternative aspects, the equipment 710 can commence periodically broadcasting or otherwise transmitting the discovery signal 502 after detecting a trigger condition 804 and during the satisfaction of the allowance condition 1002. The equipment 710 can cease periodically broadcasting or otherwise transmitting the discovery signal 502 after detecting a stop condition or based on the allowance condition 1002 no longer being satisfied.

In additional or alternative aspects, the mobile device 104a can autonomously initiate proximity service discovery without control by a base station 102 or other network control device. In some aspects, the base station 102 can direct the mobile device 104a to enter an autonomous mode for proximity service discovery signal transmission. In other aspects, the base station 102 can notify the mobile device 104a that is it permitted to enter an autonomous mode for proximity service discovery signal transmission.

Figure 12:
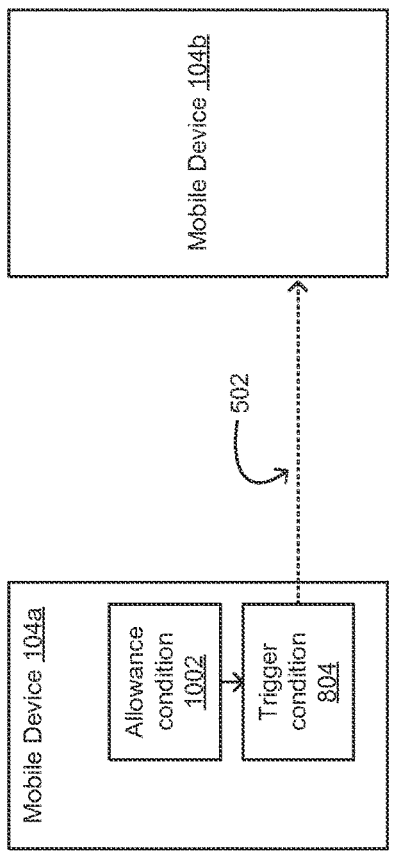
FIG. 12 is a modeling diagram illustrating an example of a flow of communications for a mobile device autonomously initiating a proximity service discovery signal transmission procedure according to exemplary embodiments of the present invention.
Figure 13:
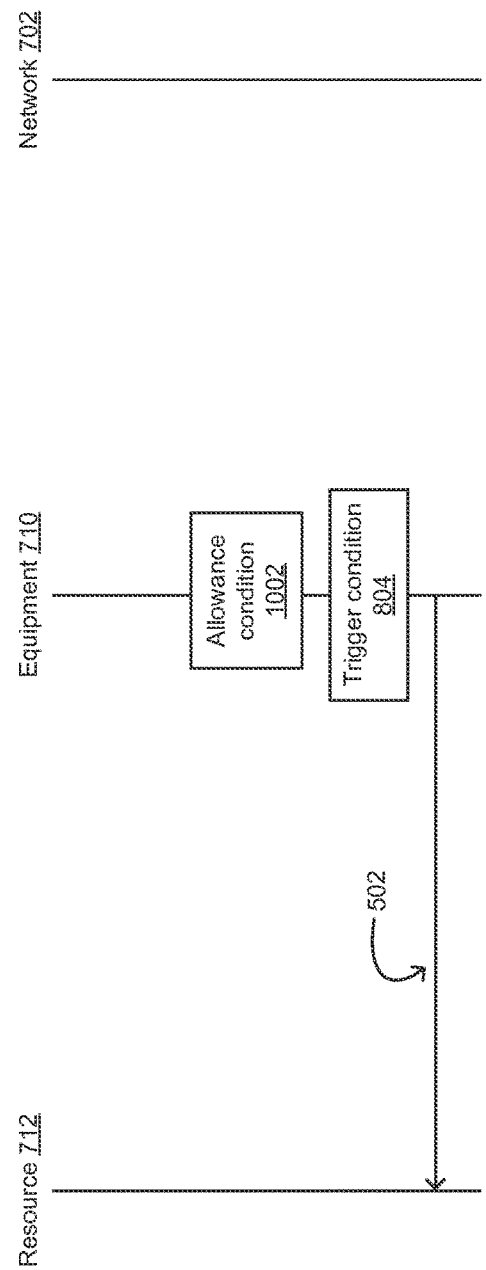
FIG. 13 is a modeling diagram illustrating an example of a flow of communications for a network device autonomously initiating a proximity service discovery signal transmission procedure according to exemplary embodiments of the present invention.

FIGS. 12-13 are modeling diagram illustrating an alternate example of a flow of communications for a mobile device 104a or other network device autonomously initiating a proximity service discovery signal transmission procedure.

As depicted in FIG. 12, the mobile device 104a can generate the discovery signal 502 in response to detecting a trigger condition 804 and/or under an allowance condition 1002 without being directed to do so by the base station 102. Non-limiting examples of an allowance condition 1002 can include detection of network coverage provided by the base station 102, detection of the signal power of the mobile device 104b, etc. The trigger detection module 412 can detect the trigger condition 804. The allowance detection module 414 can detect the allowance condition 1002. The mobile device 104a can generate discovery signal 502 as described above with respect to FIG. 6.

Another example flow of communications for a mobile device autonomously initiating a proximity service discovery signal transmission procedure is depicted in FIG. 13. The equipment 710 can monitor the allowance condition 1002 without regard to the equipment 710 receiving any communication from the network 702. The equipment 710 can detect the trigger condition 804 based on the allowance condition 1002 being satisfied. The equipment 710 can broadcast or otherwise transmit the discovery signal 502 based on detecting the trigger condition 804. In additional or alternative aspects, the equipment 710 can commence periodically broadcasting or otherwise transmitting the discovery signal 502 after detecting a trigger condition 804 and during the satisfaction of the allowance condition 1002. The equipment 710 can cease periodically broadcasting or otherwise transmitting the discovery signal 502 after detecting a stop condition or based on the allowance condition 1002 no longer being satisfied.

In additional or alternative aspects, a mobile device can switch between a network-controlled mode, as described above with respect to FIGS. 6-7, a semi-autonomous mode, as described above with respects to FIGS. 8-11, and an autonomous mode, as describe above with respect to FIGS. 12-13. In some aspects, switching between modes can be performed based on a policy setting at a mobile device. In other aspects, switching between modes can be performed in response to user input to the mobile device.

One example of a mode-switching mobile device may be a public safety device that can automatically use proximity services when network coverage is not available. An operator can, additional or alternatively, manually set a mobile device to use direct discovery and communication even when network coverage is available. The public safety device can operate in both the public safety and commercial network spectrum. The public safety device on a commercial network spectrum can act as a typical mobile device, such as a commercial device. The public safety device can be configured to send the discovery signal 502 on the public safety network spectrum whenever the public safety device detects an out-of-coverage or when an operator manually configures the mobile device. An example switching mechanism may be that if the public safety device moves or attaches to a commercial network spectrum from a public safety spectrum, the public safety device switches from an autonomous mode to a network-controlled mode or a semi-autonomous mode of proximity service discovery signal transmission. If the public safety device is on the public safety spectrum, the public safety device can use any of a network-controlled mode, a semi-autonomous mode, or an autonomous mode of proximity service discovery signal transmission.

Another example of a switching mechanism may be to use network signaling. A mobile device can support a network-controlled mode as a default. The base station 102 or another network control device can direct the mobile device to use a semi-autonomous mode of proximity service discovery by using broadcast system information, RRC dedicated signaling, physical layer signaling, a MAC control element, or NAS dedicated signaling. The base station 102 or another network control device may direct the mobile device to use a semi-autonomous mode of proximity service discovery based on whether sufficient network resources (e.g., bandwidth) is available for one or more of the base station 102 or the mobile device 104a to initiate discovery signal transmission procedure. In another example, a mobile device may support a semi-autonomous mode of proximity service discovery transmission as a default. The base station 102 or other network control device can override the default semi-autonomous mode by sending a request information or request to the mobile device 104a to initiate a proximity service discovery signal transmission procedure. Such a request can be made, for example, using broadcast system information, RRC dedicated signaling, physical layer signaling, MAC control element, or NAS dedicated signaling.

In some aspects, a mobile device 104a can periodically transmit the discovery signal 502 upon receiving control information 602 or a control information 602. The mobile device 104a can periodically transmit the discovery signal 502 based on an allowance condition being satisfied, the mobile device 104a not being reconfigured, and/or the mobile device 104a not receiving a command to cease periodically transmitting the discovery signal 502. In other aspects, the mobile device 104a can transmit the discovery signal 502 a single time in response to receiving a control information 602 containing request information 604 or allowance information 802. In other aspects, the mobile device 104a can periodically transmit the discovery signal 502 in response to detecting a triggering condition and cease transmitting the discovery signal 502 in response to detecting a stopping condition.

In additional or alternative aspects, a mobile device 104a can include a coordination module 416. The coordination module 416 can coordinate radio resources for other mobile devices of the telecommunication system 100. The mobile device 104a can generate control signals similar to control information 602 for transmission to the other mobile devices. The mobile device 104a can activate the coordination module 416 in response to a control message, such as a control message specifying a privilege to coordinate radio resource, received from the base station 102 or another network control device. Coordinating radio resources can include determining whether one or more mobiles devices coordinated by the mobile device 104a are allowed to transmit the discovery signal. Mobile devices coordinated by the mobile device 104a can respond to control signals generated by the base station 102, the mobile device 104a, or another network control device.

Although FIGS. 5-13 depict a mobile device discovering another mobile device for the purpose of proximity discovery and/or D2D communication, other implementations are possible. In additional or alternative aspects, a mobile device can discover any devices in a telecommunication system available for communication, including as a local base station or other stationary network device, such as a desktop computer configured to communicate directly with a mobile device.

General Considerations

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

Any logic or application described herein that comprises software or code can be embodied in any non-transitory computer-readable medium for use by or in connection with a computing system such as, for example, a processor in a computer system or other system. In this sense, the logic may comprise, for example, statements including instructions and declarations that can be fetched from the computer-readable medium and executed by a computing system.

In the context of the present disclosure, a "computer-readable medium" can include any medium that can contain, store, maintain, or otherwise include the logic or application described herein for use by or in connection with a computing system. The computer-readable medium can comprise any one of many physical media such as, for example, magnetic, optical, or semiconductor media. More specific examples of a suitable computer-readable medium can include, but are not limited to, magnetic tapes, magnetic floppy diskettes, magnetic hard drives, memory cards, solid-state drives, USB flash drives, optical discs, etc. The computer readable medium may be a random access memory ("RAM"). Examples of a RAM can include (but are not limited to) static random access memory ("SRAM"), dynamic random access memory ("DRAM"), magnetic random access memory ("MRAM"), etc. The computer-readable medium may be a read-only memory ("ROM"), a programmable read-only memory (PROM), an erasable programmable read-only memory ("EPROM"), an electrically erasable programmable read-only memory ("EEPROM"), or other type of memory device.

It should be emphasized that the above-described examples are merely possible implementations set forth for a clear understanding of the principles of the disclosure. Many variations and modifications may be made to the above-described examples without departing substantially from the spirit and principles of the disclosure. All such modifications and variations are intended to be included herein within the scope of this disclosure and protected by the following claims.

The invention claimed is:

1. A base station for communicating with at least one terminal capable of performing device-to-device communication with another terminal, the base station comprising:
information generating circuitry to generate control information including identification of a condition regarding a resource, using which said at least one terminal transmits a discovery signal, the discovery signal allowing said at least one terminal to be discovered by another terminal; and
transmitting circuitry configured to transmit, to said at least one terminal, the control information,
wherein, when said at least one terminal is within a coverage area of the base station, the discovery signal is transmitted at a first frequency from said at least one terminal to said another terminal, based on detection of a signal power which exceeds a threshold and is detected on the resource indicated by the control information, and when said at least one terminal is out of the coverage area of the base station, the discovery signal is transmitted at a second frequency from said at least one terminal to said another terminal, based on a predetermined resource, the second frequency being different from the first frequency, wherein:
the first frequency is a frequency used by said at least one terminal to transmit, when said at least one terminal is within the coverage area, the discovery signal,
the second frequency is a frequency used by said at least one terminal to transmit, when said at least one terminal is out of the coverage area, the discovery signal,
the control information is information allowing said at least one terminal to determine, on the basis of a determination that said at least one terminal is within the coverage area, that said at least one terminal uses the first frequency for transmitting the discovery signal, and
the control information is information allowing said at least one terminal to determine, on the basis of a determination that said at least one terminal is out of the coverage area, that said at least one terminal uses the second frequency for transmitting the discovery signal.

2. A terminal that communicates with a base station and which is capable of performing device-to-device communication with another terminal, the terminal comprising:
receiving circuitry configured to receive control information including identification of a condition regarding a resource for transmission of a discovery signal, the discovery signal allowing the terminal to be discovered by another terminal; and
control circuitry configured to, when the terminal is within a coverage area of the base station, transmit at a first frequency the discovery signal to said another terminal, based on detection of a signal power which exceeds a threshold and is detected on the resource indicated by the control information, and when the terminal is out of the coverage area of the base station, transmitting at a second frequency the discovery signal to said another terminal, based on a predetermined resource, the second frequency being different from the first frequency, wherein:
the first frequency is a frequency for transmitting, when the terminal is within the coverage area, the discovery signal,
the second frequency is a frequency for transmitting, when the terminal is out of the coverage area, the discovery signal,
the control circuitry is configured to determine, on the basis of a determination that the terminal is within the coverage area, that the terminal uses the first frequency for transmitting the discovery signal, and
the control circuitry is configured to determine, on the basis of a determination that the terminal is out of the coverage area, that the terminal uses the second frequency for transmitting the discovery signal.

3. A communication method performed by a terminal which communicates with a base station and which is capable of performing device-to-device communication with another terminal, the communication method comprising:
receiving control information including identification of a condition regarding a resource for transmission of a discovery signal, the discovery signal allowing the terminal to be discovered by another terminal; and
when the terminal is within a coverage area of the base station, transmitting at a first frequency the discovery signal to said another terminal, based on detection of a signal power which exceeds a threshold and is detected on the resource indicated by the control information, and when the terminal is out of the coverage area of the base station, transmitting at a second frequency the discovery signal to said another terminal, based on a predetermined resource, the second frequency being different from the first frequency, wherein:
the first frequency is a frequency for transmitting, when the terminal is within the coverage area, the discovery signal,
the second frequency is a frequency for transmitting, when the terminal is out of the coverage area, the discovery signal,
control circuitry is configured to determine, on the basis of a determination that the terminal is within the coverage area, that the terminal uses the first frequency for transmitting the discovery signal, and
the control circuitry is configured to determine, on the basis of a determination that the terminal is out of the coverage area, that the terminal uses the second frequency for transmitting the discovery signal.

4. A communication method performed by a base station for communicating with at least one terminal capable of performing device-to-device communication with another terminal, the communication method comprising transmitting, to said at least one terminal, control information including identification of a condition regarding a resource using which said at least one terminal transmits a discovery signal, the discovery signal allowing said at least one terminal to be discovered by another terminal, when said at least one terminal is within a coverage area of the base station, the discovery signal being transmitted at a first frequency from said at least one terminal to said another terminal, based on detection of a signal power which exceeds a threshold and is detectd on the resource indicated by the control information, when said at least one terminal is out of the coverage area of the base station, the discovery signal being transmitted at a second frequency from said at least one terminal to said another terminal, based on a predetermined resource, the second frequency being different from the first frequency, the first frequency being a frequency used by said at least one terminal to transmit, when said at least one terminal is within the coverage area, the discovery signal, the second frequency being a frequency used by said at least one terminal to transmit, when said at least one terminal is out of the coverage area, the discovery signal, the control information being information allowing said at least one terminal to determine, on the basis of a determination that said at least one terminal is within the coverage area, that said at least one terminal uses the first frequency for transmitting the discovery signal, the control information being information allowing said at least one terminal to determine, on the basis of a determination that said at least one terminal is out of the coverage area, that said at least one terminal uses the second frequency for transmitting the discovery signal.

5. The terminal of claim 2, wherein the second frequency is a frequency for Public Safety.

6. The base station of claim 1, wherein the second frequency is a frequency for Public Safety.

7. The communication method of claim 3, wherein the second frequency is a frequency for Public Safety.

8. The communication method of claim 4, wherein the second frequency is a frequency for Public Safety.

* * * * *